(12) United States Patent
Raassina et al.

(10) Patent No.: US 11,661,313 B2
(45) Date of Patent: May 30, 2023

(54) DRIVE DEVICE HAVING SAFETY CIRCUITS USING LOGIC STATES FOR AN ELEVATOR

(71) Applicant: KONE Corporation, Helsinki (FI)

(72) Inventors: Pasi Raassina, Helsinki (FI); Pekka Hytti, Helsinki (FI); Arto Nakari, Helsinki (FI); Ari Kattainen, Helsinki (FI); Juhamatti Nikander, Helsinki (FI); Olavi Vairio, Helsinki (FI)

(73) Assignee: KONE CORPORATION, Helsinki (FI)

( * ) Notice: Subject to any disclaimer, the term of this patent is extended or adjusted under 35 U.S.C. 154(b) by 1339 days.

(21) Appl. No.: 16/001,052

(22) Filed: Jun. 6, 2018

(65) Prior Publication Data

US 2018/0282123 A1 Oct. 4, 2018

Related U.S. Application Data

(63) Continuation of application No. PCT/EP2016/076920, filed on Nov. 8, 2016.

(30) Foreign Application Priority Data

Dec. 7, 2015 (EP) .................................... 15198182

(51) Int. Cl.
*B66B 5/00* (2006.01)
*H02P 29/02* (2016.01)
(Continued)

(52) U.S. Cl.
CPC .................. *B66B 5/02* (2013.01); *B66B 1/30* (2013.01); *B66B 5/0031* (2013.01);
(Continued)

(58) Field of Classification Search
CPC .... B66B 5/02–06; B66B 1/28–30; B66B 1/32
See application file for complete search history.

(56) References Cited

U.S. PATENT DOCUMENTS 4,698,780 A * 10/1987 Mandel ................. B66B 5/0006
187/393
8,631,908 B2 * 1/2014 Schroeder-Brumloop ..................
B66B 1/30
187/290
(Continued)

FOREIGN PATENT DOCUMENTS

EP 1 852 382 A1 11/2007
EP 2 412 656 A1 2/2012
(Continued)

OTHER PUBLICATIONS

International Search Report, issued in PCT/EP2016/076920, dated Mar. 13, 2017.
(Continued)

*Primary Examiner* — Christopher Uhlir
(74) *Attorney, Agent, or Firm* — Birch, Stewart, Kolasch & Birch, LLP

(57) ABSTRACT

A drive device of an elevator includes a frequency converter to be connected to a public AC supply network and an elevator motor. The frequency converter includes a network rectifier configured to be connected to the AC supply network, a motor bridge to be connected to the elevator motor and a DC intermediate circuit located between the network rectifier and the motor bridge. The motor bridge is controlled by a control circuit which feeds the motor bridge with control pulses to regulate the motor speed. The drive device further includes at least one drive prevention circuit connected between the control circuit and the motor bridge. The drive prevention circuit is configured to obtain a safety signal from an elevator safety circuit includes two separate safety input circuits each configured to be connected to the elevator safety circuit to receive a safety signal. Each of the safety input circuits is configured to interrupt the connection (Continued)

between the control circuit and the motor bridge in response to the safety signal status.

18 Claims, 1 Drawing Sheet

(51) Int. Cl.
*B66B 5/02* (2006.01)
*B66B 1/30* (2006.01)
*H02P 29/024* (2016.01)
*B66B 11/04* (2006.01)
*G05B 19/048* (2006.01)

(52) U.S. Cl.
CPC .......... *B66B 11/043* (2013.01); *G05B 19/048* (2013.01); *H02P 29/0241* (2016.02)

(56) References Cited

U.S. PATENT DOCUMENTS

| | | |
|---|---|---|
| 2012/0292136 A1 | 11/2012 | Washio et al. |
| 2013/0118836 A1 | 5/2013 | Rossignol |
| 2017/0349398 A1* | 12/2017 | Toutaoui ............... B66B 5/0025 |

FOREIGN PATENT DOCUMENTS

| | | | |
|---|---|---|---|
| WO | WO 2009/013388 A1 | 1/2009 | |
| WO | WO 2013/178874 A1 | 12/2013 | |
| WO | WO-2013178874 A1 * | 12/2013 | ............. B66B 1/308 |

OTHER PUBLICATIONS

Written Opinion of the International Searching Authority, issued in PCT/EP2016/076920, dated Mar. 13, 2017.

* cited by examiner

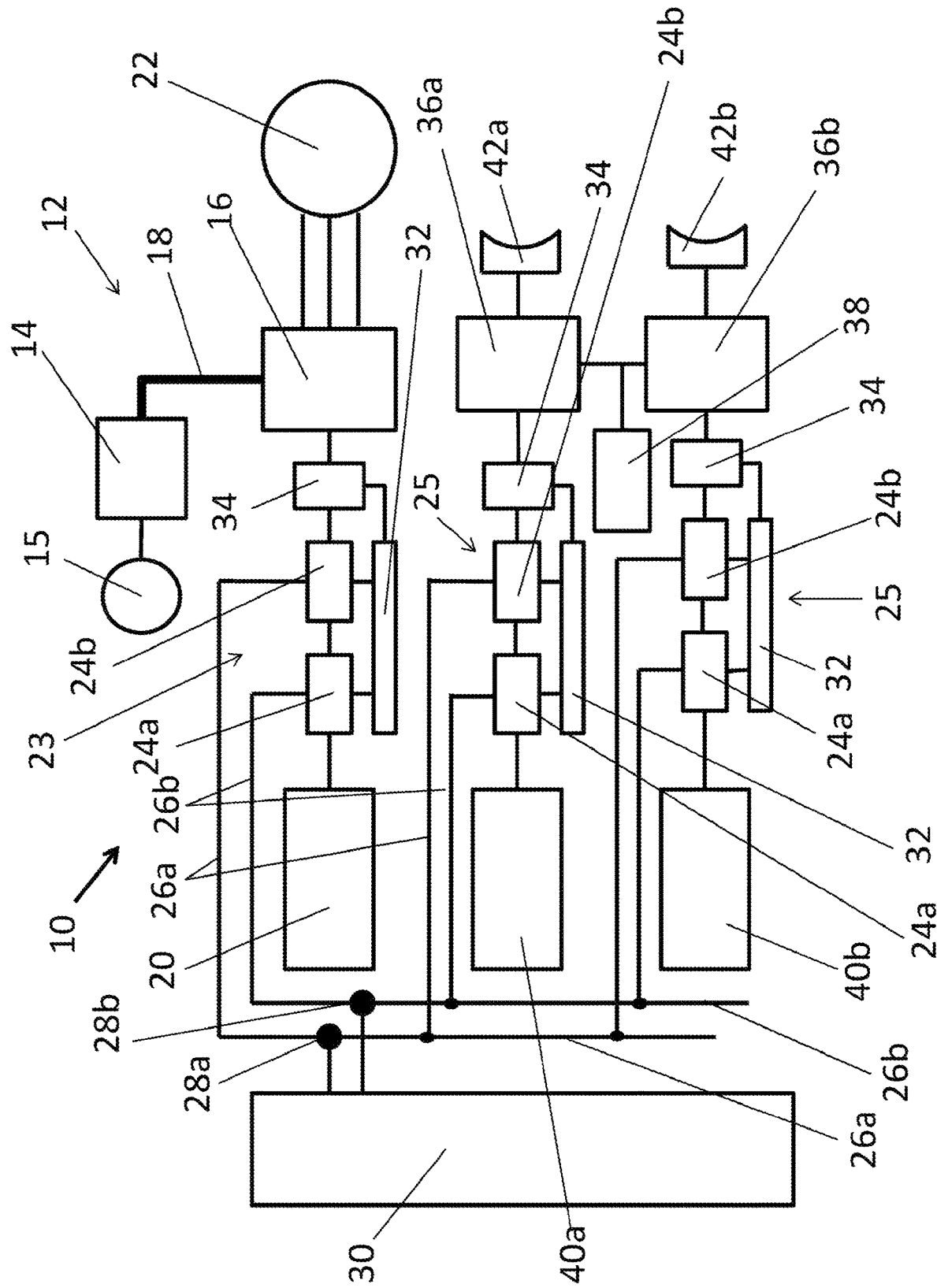

DRIVE DEVICE HAVING SAFETY CIRCUITS USING LOGIC STATES FOR AN ELEVATOR

CROSS REFERENCE TO RELATED APPLICATIONS

This application is a Continuation of PCT International Application No. PCT/EP2016/076920, filed on Nov. 08, 2016, which claims priority under 35 U.S.C. 119(a) to Patent Application No. 15198182.6, filed in Europe on Dec. 07, 2015, all of which are hereby expressly incorporated by reference into the present application.

BACKGROUND OF THE INVENTION

The present invention relates to a drive device of an elevator as well as to an elevator having such a drive device. The most relevant drive devices in elevators are the motor drive as well as the brake drive. Usually, the motor drive comprises a frequency converter which is to be connected to a public AC supply network. The frequency converter comprises a network rectifier and a DC intermediate circuit which provides the sufficient current for a motor bridge to drive the elevator motor. The motor bridge usually comprises solid state switches, as e.g. IGBTs whereby for three phases six solid-state switches are used, two for each phase and for each phase one for the positive voltage part and one for the negative voltage part. The semiconductor switches are controlled by a control unit which controls the control gate of the semiconductor switches as to rotate the elevator motor according to reference values. To ensure a safe stop of the elevator motor in unsafe conditions, a drive prevention circuit can be located in the connection between the control circuit and the motor bridge (or inverter) to receive a safety signal from an elevator safety circuit and to disconnect the connection in case of operational abnormalities or safety problems. Such a device is known from WO 2013/178874 A1. The problem which should be solved by this solution is to allow the concept of an elevator drive without main contactors. Main contactors are quite expensive and make the whole drive more complex.

SUMMARY OF THE INVENTION

It is object of the present invention to improve the aforementioned drive device and elevator such that the general safety level is improved as to allow the omission of main contactors with the elevator drive.

The object is solved with a drive device according to claim 1 as well as with an elevator according to claim 14. Preferred embodiments of the invention are subject-matter of the corresponding dependent claims. Advantageous embodiments are also described in the description as well as in the drawings.

According to the invention, the drive prevention circuit comprises two separate safety input circuits each configured to be connected to the elevator safety circuit to receive a safety signal, respectively. Furthermore, each of the safety input circuits is configured to interrupt the connection between the control circuit and the motor bridge. The interruption occurs preferably by the safety input circuit itself, but could also performed via a separate circuit. As the main contactors of the elevator drive as hardware elements improving the safety of the drive are to be left away, the invention seeks to compensate a corresponding high safety level by providing redundant safety signalling and redundant input safety circuits which each are able to interrupt the connection between the control circuit and the motor bridge as to shut the elevator motor off. This arrangement ensures that even in case of breakdown of one signal line and/or one safety input circuit, the other safety input circuit and the other signal line are still able to interrupt the transmission of control signals from the control circuit to the motor bridge in case of any operation anomalies.

Preferably, the two safety input circuits are connected to a shut-down circuit of the drive prevention circuit which is configured to monitor the safety input circuits and preferably also to interrupt the connection between the control circuit and the motor bridge. The advantage of the shut-down circuit is that this additional circuit can be used to monitor the function of the two separate safety input circuits as to gather information regarding the reliability of the redundant signal transmission. On this behalf, the shut-down circuit preferably has a fault memory for storing safety shut-down events in the operation history of the elevator. Preferably, this shut-down circuit is itself able to interrupt the connection between the control circuit and the motor bridge as to initiate the disconnection of the control circuit from the motor bridge if the operating history of the safety input circuits indicate a certain safety problem in the signal transmission or in the occurrence of safety shut-downs. Preferably, the shut-down circuit does not only comprise a fault memory but also comprises a diagnosis circuit for the monitoring and function evaluation of the safety input circuits or brake safety input circuits. The fault-memory of the shut-down circuit may be read e.g. by a maintenance tool or by a remote maintenance center. Further, the diagnosis circuit may preferably be configure to issue a maintenance signal to a remote maintenance center, e.g. via telephone network or internet.

Preferably, two separate signal communication channels are arranged to be connected to separate outputs of the elevator safety circuit and to be connected with the two safety circuits, whereby one of both channels is connected to one of said safety input circuits, respectively. The basic redundancy idea is here extended to the signal transmission line from the elevator safety circuit to the safety input circuits. Preferably, in the inventive elevator the elevator safety circuit has two parallel safety switches or modules for one safety function, so that not only the safety input circuits and the signal transmission but also the safety signal generation is redundant.

In a preferred embodiment of the invention, the drive device comprises a brake drive configured to be connected to at least one elevator motor brake, which brake drive is connected to a brake controller via a brake drop-out circuit, which is per se known from WO 2013/178874 A1. According to the invention, the brake drop-out circuit has two (brake) safety input circuits configured to be connected to the elevator safety circuit and each of the brake safety input circuits is configured to interrupt the connection between the brake control circuit and the brake drive. The safety input circuits for the motor drive and the brake drive could preferably be identical. Usually, the brake drive comprises like the motor bridge at least one semiconductor switch to shut-down or to initiate the feeding of current to the elevator motor brake. Usually, the feeding of current to the motor brake means the releasing, i.e. opening of the brake, whereas the shut-down of current to the brake initiates immediate closing of the brake whereby the elevator motor brake usually grips a rotating part of the motor or of a traction sheave connected to the motor. The brake drive normally gets its energy from a brake energy supply circuit which is normally a DC converter to be connected with a public AC supply network. This advantageous embodiment of the invention raises the safety regarding the operation of the motor brake to the same safety level as the stopping of the elevator motor in any case of operation anomaly as now two independent safety input circuits are located in the connection between the brake controller and the brake drive as to initiate braking an any case of unclear safety situation of the elevator. Therefore, this embodiment of the invention provides a high safety level.

Preferably, the two brake safety circuits are connected to a shut-down circuit of the brake drop-out circuit which shut-down circuit is configured to monitor the (brake) safety input circuits and preferably also to disconnect the connection between the brake controller and the brake drive. Accordingly, the operation of the elevator brake in any case of operational anomaly of the elevator is essentially improved. Also in this case, the shut-down circuit opens (as already mentioned in connection with the motor bridge) the possibility to monitor the (brake) safety input switches and to initiate the operation of the elevator motor brake if the operation history of the brake safety input circuits indicates any kind of loss of safety level. Therefore, the safety of the overall device is not only improved by the redundant safety signal processing but also by the monitoring of the two independent brake safety input circuits as to check the operation history of these circuits to any kind of operational defects. For the advantages regarding the safety input circuit monitoring reference is made to the statements in connection with the motor drive. Thus the shut-down circuit may have a fault-memory and a diagnosis circuit.

Preferably, an elevator comprises two parallel elevator motor brakes. In this case, of course, two (solid state) brake drives are provided which are each connected to a corresponding separate brake controller via a separate brake drop-out circuit. Via this measure, the increase of the safety level is achieved for each of the two elevator motor brakes independently.

Preferably, the safety signals in the signal transmission are 24V signals which are the common voltage levels in an elevator safety logic/circuit. Therefore, the output signals of the elevator safety circuit can be used without any further processing which would induce possible failure sources in the signal processing.

Preferably, the safety input circuit or the brake safety input circuit is embodied as a digital isolator or optical isolator arranged in a control line (between control circuit/brake controller and motor bridge/brake drive) of the solid state switches of the motor bridge or brake drive. Via this embodiment, a reliable disconnection of the signal line to the control contactors of the solid-state switches of the motor bridge and brake drive is obtained.

Of course, it is also possible that the safety input circuit disconnects different signal or supply lines of the motor bridge or brake drive. Thus, one of the safety input circuits can for example disconnect the control line for the control gate of the semiconductor switches of the motor bridge/brake drive whereas the other safety input circuit may disconnect the energy supply line of the motor bridge/brake drive. Via this way, the shut-down of the corresponding drive is even realized via different disconnection lines.

Preferably, the fault memory or the diagnosis circuit of the shut-down circuit could also be read out for example by remote access or via service technicians on site. Thus, the shut-down circuit may comprise a safety logic SSD, which is used for diagnosis operation of the safety input circuits and the signal channels from the elevator safety circuit to the safety input circuits. One SSD may read logic states of the first and the second safety lines and safety input circuits and may interrupt the connection of the control circuit to the motor bridge or of the brake controller to the brake drive in which case the logic states of both safety channels differ from each other at least for a given period. This may be also memorized in the fault memory of the shut-down circuit. Preferably, to resume normal operation, e.g. to restart supplying control pulses from the control circuit to the motor bridge via the control line, the fault memory hardware must be resetted, i.e. via a service technician. The memory function can be implemented in the fault memory of a PWM generating DSP processor, e.g. in the control circuit or alternatively with a separate logic hardware. With the fault memory function implemented in a separate hardware, a higher reliability can be used as when this memory function is provided in the DSP processor of the control circuit.

The invention further relates to an elevator comprising an elevator motor for moving an elevator car, at least one, preferably two elevator motor brakes, at least one drive device of the aforementioned kind, preferably one drive device for the motor bridge and one drive device for each of the two motor brakes. Furthermore, the elevator further comprises at least one elevator safety circuit, for example an elevator safety logic issuing a safety signal indicative of the current safety situation of the elevator. This kind of elevator provides a very high safety level, as e.g. SIL3 safety level which enables the omission of hardware contactors in connection with the elevator drive.

Preferably, the elevator safety circuit/controller has for each safety function two independent safety switches or safety modules which are connected via separate safety channels or safety lines to the two (brake) safety input circuits of the drive prevention circuit or brake drop-out circuit. Via this embodiment, the redundancy level is kept up into the function of the elevator safety circuit itself. Therefore, this embodiment of an elevator provides a very high safety standard.

Preferably the two safety input circuits are series connected in the connection between control circuit/brake controller and motor bridge/brake drive. The shut-down circuit is preferably connected with an own interruption circuit located in the control line of the motor bridge/brake drive to interrupt the control signals and stop the elevator motor/start the brake operation.

Following terms are used as synonyms: elevator safety logic—elevator safety controller—elevator safety circuit;

BRIEF DESCRIPTION OF THE DRAWINGS

The invention is hereinafter described with respect to the appended schematic drawing. This drawing shows a schematic diagram of an elevator with a high safety standard.

DESCRIPTION OF THE PREFERRED EMBODIMENTS

The elevator 10 comprises a frequency converter 12 consisting of a network rectifier 14 to be connected to a public AC supply network 15, a motor bridge 16 and a DC intermediate circuit 18 located between the network rectifier 14 and the motor bridge 16. The motor bridge 16 preferably comprises IGBTs as solid state switches and is controlled by a control circuit 20 as to drive an elevator motor 22 in line with reference values or reference curves. Between the control circuit 20 and the motor bridge 16, a drive prevention circuit 23 is located comprising two safety input circuits 24*a*, 24*b*, a shut-down circuit 32 and an interruption circuit 34. The safety input circuits 24a, 24b are series connected whereby each of these safety input circuits 24a, 24b is able to disconnect the control circuit 20 from a control input of the motor bridge 16. Each safety input circuit 24a, 24b is configured to be connected via a separate signal channel 26a, 26b to two safety outputs 28a, 28b of an elevator safety circuit 30. The two signal outputs 28a, 28b are the outputs of two independent safety switches or safety modules in the elevator safety circuit 30 provided for the same safety function. Thus, for example two parallel door contacts can be provided for a landing door, whereby one of the contacts is connected to one of the signal channels 26a, 26b, respectively. Via this measure, the redundancy of the safety signal transmission to the safety input circuits 24a, 24b can be extended to the safety signal generation. The safety input circuits 24a, 24b are connected to the common shut-down circuit 32 which is configured to monitor the function of each of the safety input circuits 24a, 24b and the corresponding signal channels 26a, 26b. On this behalf, the shut-down circuit 32 preferably has a diagnosis circuit as well as a fault memory. The shut-down circuit 32 has an own interruption circuit 34 which is able to interrupt the connection between the control circuit 20 and the motor bridge 16 even in a case when currently the signal outputs of the safety input circuits 24a, 24b are positive but the operation history of these circuits revealed that there is some ambiguity in the safety level.

The elevator 10 furthermore has two brake drives 36a, 36b for two elevator motor brakes 42a,b of the elevator. The brake drives 36a,b are connected with a common power supply 38, usually a DC converter connected with the public AC supply network 15. Each brake drive 36a, 36b is connected with a brake controller 40a, 40b which brake controllers 40a, 40b are configured to initiate the closing or opening of corresponding elevator motor brakes 42a, 42b. In the connection between the brake controllers 40a, 40b and the brake drives 36a, 36b a brake drop-out circuit 25 is located comprising the same arrangement of two (brake) safety input circuits 24a, 24b, a drop-out circuit 32 and an interruption circuit 34 is provided as in the control line of the motor bridge 16. Accordingly, the control devices 20, 40a,b are connected with the motor bridge 16 as well as each of the brake drives 36a, 36b via a parallel redundant safety system comprising first and second safety channels 26a, 26b and the corresponding safety input circuits 24a,b as to ensure safe action even if one signal line 26a,b or one safety input circuit 24a,b should fail. This redundant safety system is again improved by the shut-down circuit 32 which is capable of monitoring the function of the safety input circuits 24a,b as well as the safety channels 26a,b and to trigger the interruption circuit 34 to shut-down the control line if the operation history of these safety relevant components leave any doubt with regard to the safety of the elevator. Via this inventive embodiment, not only a redundancy level for the safety signal processing is obtained but also the reliability of these safety components 24a, 24b, 26a, 26b over the time can be monitored and evaluated via the shut-down circuit 32 which additionally can interrupt the connection between the corresponding controllers 40a, 40b and the motor bridge 16 or brake drive 36a, 36b.

Accordingly, such a kind of elevator reaches safety integrity level (SIL) 3 which is a current safety code requirement for elevator safety control when hardware logic elements should be used to replace mechanical safety contactors.

The invention is not restricted to the disclosed embodiment but it can be modified within the scope of the appended patent claims.

LIST OF REFERENCE NUMBERS 10 elevator
12 frequency converter
14 network rectifier
15 AC supply network
16 motor bridge
18 DC intermediate circuit
20 control circuit
22 elevator motor
23 drive prevention circuit
24a,b safety input circuit
25 brake drop-out circuit
26a,b safety channel
28a,b signal outputs
30 elevator safety circuit
32 shut-down circuit
34 interruption circuit
36a,b brake drive
38 common power supply
40a,b brake controller

The invention claimed is:

1. A drive device of an elevator, comprising:
a frequency converter to be connected to a public AC supply network and an elevator motor, the frequency converter comprising:
  a network rectifier configured to be connected to the AC supply network;
  a motor bridge to be connected to the elevator motor; and
  a DC intermediate circuit located between the network rectifier and the motor bridge,
a control circuit which feeds the motor bridge with control pulses to regulate a motor speed; and
at least one drive prevention circuit connected between the control circuit and the motor bridge, the at least one drive prevention circuit being configured to obtain a safety signal from an elevator safety circuit,
wherein the at least one drive prevention circuit comprises two separate safety input circuits, each of the two safety input circuits being configured to be connected to the elevator safety circuit to receive a safety signal,
wherein the two safety input circuits are connected to a shut-down circuit of the at least one drive prevention circuit which is configured to monitor the safety input circuits,
wherein the shut-down circuit has a diagnosis circuit for the function of the safety input circuits,
wherein the diagnosis circuit interrupts the connection of the control circuit to the motor bridge in response to logic states of the two safety circuits differing from each other for at least a given period, and
wherein each of the two safety input circuits is configured to interrupt the connection between the control circuit and the motor bridge in response to a safety signal status.

2. The drive device according to claim 1, wherein the shut-down circuit of the at least one drive prevention circuit is configured to disconnect the connection between the control circuit and the motor bridge.

3. The drive device according to claim 1, wherein two separate signal communication channels are arranged between said elevator safety circuit and the two safety input circuits, whereby one channel of the two separate signal communication channels is connected to one of said safety input circuits, respectively.

4. The drive device according to claim 1, comprising a brake drive configured to be connected to at least one elevator motor brake, the brake drive being connected to a brake controller via a brake drop-out circuit,
   wherein the brake drop-out circuit has two brake safety input circuits configured to be connected to the elevator safety circuit, and
   wherein each of the two brake safety input circuits is configured to interrupt the connection between the brake controller and the brake drive.

5. The drive device according to claim 4, wherein the two brake safety input circuits are connected to a shut-down circuit of the brake drop-out circuit, the shut-down circuit being configured to monitor the two brake safety input circuits.

6. The drive device according to claim 5, wherein the shut-down circuit is configured to monitor the two brake safety input circuits.

7. The drive device according to claim 4, comprising two solid state brake drives, the two solid state brake drives being each connected to a corresponding separate brake controller via a separate brake drop-out circuit.

8. The drive device according to claim 1, wherein safety signals are 24V DC signals.

9. The drive device according to claim 4, wherein at least one of the brake safety circuits is a digital isolator or optical isolator arranged in a control line of solid state switches of the motor bridge/brake drive.

10. The drive device according to claim 1, wherein the shut-down circuit comprises a fault memory.

11. The drive device according to claim 10, wherein the fault memory is configured to be connected to a reading device.

12. An elevator comprising:
   an elevator motor for moving an elevator car;
   at least one elevator motor brake;
   at least one drive device according to claim 4; and
   at least one elevator safety circuit having at least one safety signal output connected with each of the two brake safety input circuits.

13. The elevator according to claim 12, wherein the elevator safety circuit has two independent safety signal outputs which are connected via separate safety channels to one of the two safety input circuits of the at least one drive prevention circuit/brake drop-out circuit, respectively.

14. The drive device according to claim 1, wherein the two safety input circuits-are connected to a shut-down circuit of the at least one drive prevention circuit which is configured to monitor the safety input circuits and to disconnect the connection between the control circuit and the motor bridge.

15. The drive device according to claim 5, wherein the shut-down circuit is configured to monitor the safety input circuits and disconnect the brake drive from the at least one elevator motor brake dependent on output signals of both safety input circuits.

16. The drive device according to claim 2, wherein two separate signal communication channels are arranged between said elevator safety circuit and the two safety input circuits, whereby one channel is connected to one of said safety input circuits, respectively.

17. The drive device according to claim 1, comprising a brake drive configured to be connected to at least one elevator motor brake, the brake drive being connected to a brake controller via a brake drop-out circuit,
   wherein the brake drop-out circuit has two brake safety input circuits configured to be connected to the elevator safety circuit, and
   wherein each of the brake safety input circuits is configured to interrupt the connection between the brake controller and the brake drive.

18. The drive device according to claim 1, wherein the shut-down circuit further comprises an interruption circuit which interrupts the connection between the control circuit and the motor bridge when signal outputs of the two safety input circuits are positive but an operation history of the two safety input circuits have ambiguity in a safety level.

\* \* \* \* \*